United States Patent [19]

Toratani et al.

[11] 4,108,673

[45] Aug. 22, 1978

[54] OPTICAL PHOSPHATE GLASS IN WHICH THE LENGTH OF THE LIGHT PATH IS TEMPERATURE INDEPENDENT

[75] Inventors: Hisayoshi Toratani, Hidaka; Tetsuro Izumitani, Hino, both of Japan

[73] Assignee: Hoya Corporation, Tokyo, Japan

[21] Appl. No.: 861,336

[22] Filed: Dec. 16, 1977

[30] Foreign Application Priority Data

Dec. 22, 1976 [JP] Japan ................. 51-155374

[51] Int. Cl.$^2$ .................................................. C03C 3/16
[52] U.S. Cl. ............................................... 106/47 Q
[58] Field of Search ....................................... 106/47 Q

[56] References Cited

U.S. PATENT DOCUMENTS

| 3,490,928 | 1/1970 | Brewster et al. | 106/47 Q |
| 3,836,375 | 9/1974 | Broemer et al. | 106/47 Q |
| 3,979,322 | 9/1976 | Alexeev et al. | 106/47 Q |
| 3,999,997 | 12/1976 | Faulstich et al. | 106/47 Q |

Primary Examiner—O. R. Vertiz
Assistant Examiner—Mark Bell

Attorney, Agent, or Firm—Sughrue, Rothwell, Mion, Zinn and MacPeak

[57] ABSTRACT

A phosphate optical glass, whose length of the light path is substantially independent of temperature, comprising, in % by weight,

| | |
|---|---|
| $P_2O_5$ | 27 – 55 |
| $K_2O$ | 6 – 26 |
| BaO | 10 – 50 |
| $K_2O$ + BaO | larger than 35 |
| $Al_2O_3$ | 2 – 15 |
| $TiO_2$ + $Nb_2O_5$ + $Ta_2O_5$ | 4 – 20 |
| $TiO_2$ | 0 – 14 |
| $Nb_2O_5$ | 0 – 20 |
| $Ta_2O_5$ | 0 – 7 |
| $B_2O_3$ | 0 – 5 |
| $Li_2O$ | 0 – 2 |
| $Na_2O$ | 0 – 5 |
| MgO | 0 – 6 |
| CaO | 0 – 8 |
| SrO | 0 – 10 |
| ZnO | 0 – 10 |
| PbO | 0 – 13, and |
| $As_2O_3$ | 0 – 2. |

1 Claim, No Drawings

OPTICAL PHOSPHATE GLASS IN WHICH THE LENGTH OF THE LIGHT PATH IS TEMPERATURE INDEPENDENT

BACKGROUND OF THE INVENTION

1. Field of the Invention

This invention relates to an optical phosphate glass in which the temperature dependence of the length of the light path is nearly zero and which has a small Abbe number.

2. Description of the Prior Art

It is well known that when a temperature gradient occurs in glass, the length of the light path changes, and the wave front is distorted in the interior of the glass. This reduces the ability of the glass to form a focused image. For example, when a glass is used in a laser system, a temperature gradient is developed inside the glass by localized heating induced by the laser beam, and consequently, the beam is distorted. When glass is exposed to extreme temperature changes, for example, optical instruments set in a spacecraft, the length of the light path changes due to the temperature gradient generated in the glass, and a distortion occurs in the wave front, which in turn results in a reduction in the ability of the glass to form a focused image. Therefore, it would be very advantageous to construct an optical system using a glass in which the length of the light path is quite independent of temperature.

Changes in the length of the light path based on temperature changes in a glass sheet whose optical surfaces are parallel planes can be calculated using the following equation.

$$\Delta W_G = [\alpha(n-1) + dn/dT] \cdot l \cdot \Delta T$$

or if $$\Delta W_G = G \cdot l \cdot \Delta T$$

then, $$G = \alpha(n-1) + dn/dT$$

wherein:

$\alpha$ is the coefficient of thermal expansion of the glass (in $°C^{-1}$);

$n$ is the refractive index of the glass;

$l$ is the thickness of the glass sheet, and $\Delta T$ represents the temperature change (in $°C$).

When $\Delta w_G$ changes due to the occurrence of a temperature gradient in various parts of the glass sheet then a distortion occurs in the wave front. In the above equation, the term $$G = \alpha(n-1) + dn/dT$$

is the part of the equation at which the change of the length of the light path is determined by the composition of the glass sheet. Hence, by reducing G to 0, the change in the length of the light path based on the temperature gradient in the glass can be removed. For this purpose, $dn/dT$ should be a negative value since $\alpha(n-1)$ normally has a positive value.

Separately, there is a change in the length of the light path which is caused by thermal stress in the glass. This change is shown by the following equation.

$$\Delta W_s = \delta n/\delta\sigma \cdot d\sigma/dT \cdot l \cdot \Delta T$$

wherein $\sigma$ represents the thermal stress, $n$ is the refractive index of the glass, $l$ is the thickness of the glass and $\Delta T$ is the temperature change.

Since $\Delta W_s$ normally has a positive value, in order to reduce the change of the total length of the light path to zero, i.e., $$\Delta W = \Delta W_G + \Delta W_s = 0$$

$\Delta W_G$ must be $<0$, and hence, $G < 0$.

Glasses having a small Abbe number and where the length of the light path is independent of temperature must be rendered achromatic by combining glasses having a large Abbe number.

Japanese Patent Application (OPI) No. 37109/76 discloses a glass having an Abbe number $vd$ in the range of 30 to 45 and where the length of the light path is nearly independent of temperature. This glass, however, is a fluoroborosilicate glass, and poses many manufacturing problems because the glass contains fluorine.

Japanese Patent Publication 1091/73 and Japanese Patent Application (OPI) No. 37108/76 also disclose a glass which is free from a temperature dependence. The glass disclosed in Japanese Patent Publication 1091/73 has a refractive index of 1.5 or less and an Abbe number of 50 to 65 and contains fluorine which involves many manufacturing problems as in Japanese Patent Application (OPI) No. 37109/76. Further, the glass disclosed in Japanese Patent Application (OPI) No. 37108/76 has a refractive index of 1.59 to 1.65 and an Abbe number of 55 to 46, which are narrower than those of this invention.

SUMMARY OF THE INVENTION

According to the present invention, an optical glass is obtained which has an Abbe number in the range of 51 to 33, which has a refractive index ($nd$) of 1.57 to 1.68, and whose length of the light path is independent of temperature. The present invention is based on the discovery that in a phosphate glass, $K_2O$ and $BaO$ are components which cause the $dn/dT$ to have a high negative value, and that in phosphate glasses containing these components in great amounts, even when $TiO_2$, $Nb_2O_3$ and $Ta_2O_5$ are added in considerable amounts, the $dn/dT$ still remains a high negative value, and the $g$ value does not exceed $+1.5 \times 10^{-6}/°C$.

Accordingly, the present invention provides a phosphate optical glass, whose length of the light path is substantially temperature independent, which comprises in % by weight,

| | |
|---|---|
| $P_2O_5$ | 27 – 55 |
| $K_2O$ | 6 – 26 |
| $BaO$ | 10 – 50 |
| $K_2O + BaO$ | larger than 35 |
| $Al_2O_3$ | 2 – 15 |
| $TiO_2 + Nb_2O_5 + Ta_2O_5$ | 4 – 20 |
| $TiO_2$ | 0 – 14 |
| $Nb_2O_5$ | 0 – 20 |
| $Ta_2O_5$ | 0 – 7 |
| $B_2O_3$ | 0 – 5 |
| $Li_2O$ | 0 – 2 |
| $Na_2O$ | 0 – 5 |
| $MgO$ | 0 – 6 |
| $CaO$ | 0 – 8 |
| $SrO$ | 0 – 10 |
| $ZnO$ | 0 – 10 |
| $PbO$ | 0 – 13, and |
| $As_2O_3$ | 0 – 2. |

DETAILED DESCRIPTION OF THE INVENTION $P_2O_5$ is a glass-forming oxide essentially providing a large $\alpha$, and a negative $dn/dT$ value to the glass. In order to obtain a stable glass, $P_2O_5$ should be present in an amount of 27 to 55%.

$K_2O$ and BaO are components essential for causing the $dn/dT$ to be highly negative and the total amount of these components should be larger than 35%. If the amount of $K_2O$ is less than 6% by weight, a devitrification of the glass tends to occur. If the amount of $K_2O$ is larger than 25%, the $\alpha$ value of the glass tends to be too large. BaO is less effective than $K_2O$ in causing the $dn/dT$ value to be negative but BaO provides a chemical resistance which is higher and it has less of an effect in increasing the $\alpha$ value. Hence, BaO is also an effective component and a suitable amount of BaO is 10 to 50%.

$Al_2O_3$ stabilizes the glass, increases the chemical resistance of the glass and reduces the $\alpha$ value, but increases the $dn/dT$ value. Hence, a suitable amount of $Al_2O_3$ is 2 to 15%.

The total amount of $TiO_2 + Nb_2O_5 + Ta_2O_5$ should be 4 to 20%. $TiO_2$ is quite effective in reducing the Abbe number of the glass, but if $TiO_2$ is used in an amount greater than 14%, devitrification of the glass tends to occur. A violet color may sometimes form due to the presence of $Ti^{3+}$, but this color can be removed by adding 0 to 2% of $As_2O_3$. $Nb_2O_5$ has a greater tendency to stabilize the glass than does $TiO_2$, and can be added in an amount of up to 20%. Coloration by $Nb_2O_5$ does not pose a problem. $Ta_2O_5$ can be added in an amount of up to 7% without affecting the stability of the glass.

$B_2O_3$, in an amount of up to 5%, is effective for stabilizing the glass. When $P_2O_5$ is replaced by $B_2O_3$, the coloration due to $Ti^{3+}$ can be markedly reduced, but $B_2O_3$ somewhat reduces the chemical resistance of the glass. $Li_2O$, when used as a replacement for $K_2O$, reduces the $\alpha$ value of the glass, but increases the $dn/dT$ value of the glass. Hence, a suitable amount of $Li_2O$ is up to 2%. Likewise, $Na_2O$ can be introduced in an amount of up to 5%.

MgO, CaO, SrO, and ZnO are effective as components for reducing the $\alpha$ value of the glass when the amount thereof is up to 6%, 8%, 10% and 10%, respectively. If these amounts exceed the limits specified above, devitrification of the glass tends to occur, and the $dn/dT$ value increases.

PbO can be introduced without increasing the $dn/dT$ value very much. PbO reduces the $vd$ of the glass, but increases the $nd$ markedly. Accordingly, a suitable amount of PbO is up to 13%.

Some representative examples of the glass of this invention and their physical properties are shown in the following tables. However, the present invention should not be construed as being limited to these examples. All percents are by weight.

Table 1

| Component | Example No. | | | | | |
|---|---|---|---|---|---|---|
| | 1 | 2 | 3 | 4 | 5 | 6 |
| $P_2O_5$ | 52.6 | 43.3 | 30.8 | 33.2 | 41.2 | 32.7 |
| $K_2O$ | 15.9 | 25.0 | 7.7 | 8.3 | 12.2 | 8.1 |
| BaO | 20.7 | 11.7 | 50.0 | 44.8 | 34.8 | 44.1 |
| $Al_2O_3$ | 3.4 | 7.8 | 2.8 | 9.0 | 6.6 | 5.9 |
| $TiO_2$ | 5.4 | 12.2 | 8.7 | 4.7 | 5.2 | 9.2 |
| $Nb_2O_5$ | — | — | — | — | — | — |
| $Ta_2O_3$ | — | — | — | — | — | — |
| $B_2O_3$ | — | — | — | — | — | — |
| $Li_2O$ | — | — | — | — | — | — |
| $Na_2O$ | — | — | — | — | — | — |
| MgO | — | — | — | — | — | — |
| CaO | — | — | — | — | — | — |
| SrO | — | — | — | — | — | — |
| ZnO | — | — | — | — | — | — |
| PbO | — | — | — | — | — | — |
| $As_2O_3$ | 2.0 | — | — | — | — | — |
| nd | 1.5735 | 1.6000 | 1.6612 | 1.6106 | 1.5978 | 1.6501 |
| $vd$ | 43.8 | 34.7 | 38.0 | 50.4 | 46.2 | 40.8 |
| $\alpha$ 20–40° C($\times 10^{-7}$/° C) | 141 | 140 | 122 | 133 | 128 | 116 |
| dn/dT 20–40° C($\times 10^{-6}$/° C) | −10.2 | −9.0 | −9.4 | −8.5 | −8.7 | −6.8 |
| G 20–40° C($\times 10^{-6}$/° C) | −2.1 | −0.6 | −1.3 | −0.4 | −1.0 | +0.7 |
| Da | 3 | 2 | 4 | 2 | 3 | 3 |

| Component | Example No. | | | | | |
|---|---|---|---|---|---|---|
| | 7 | 8 | 9 | 10 | 11 | 12 |
| $P_2O_5$ | 30.8 | 34.8 | 29.5 | 31.9 | 36.7 | 35.9 |
| $K_2O$ | 7.7 | 14.4 | 7.3 | 7.9 | 15.2 | 14.9 |
| BaO | 41.6 | 28.2 | 39.9 | 43.1 | 29.8 | 29.1 |
| $Al_2O_3$ | 5.5 | 6.3 | 5.3 | 5.7 | 6.6 | 6.4 |
| $TiO_2$ | — | — | — | 5.4 | 8.3 | 8.1 |
| $Nb_2O_5$ | 14.4 | 16.3 | 18.0 | 6.0 | 3.4 | — |
| $Ta_2O_3$ | — | — | — | — | — | 5.6 |
| $B_2O_3$ | — | — | — | — | — | — |
| $Li_2O$ | — | — | — | — | — | — |
| $Na_2O$ | — | — | — | — | — | — |
| MgO | — | — | — | — | — | — |
| CaO | — | — | — | — | — | — |
| SrO | — | — | — | — | — | — |
| ZnO | — | — | — | — | — | — |
| PbO | — | — | — | — | — | — |
| $As_2O_3$ | — | — | — | — | — | — |
| nd | 1.6471 | 1.6164 | 1.6647 | 1.6495 | 1.6243 | 1.6202 |
| $vd$ | 45.0 | 44.5 | 41.7 | 42.9 | 38.5 | 39.4 |
| $\alpha$ 20–40° C($\times 10^{-7}$/° C) | 119 | 128 | 114 | 118 | 128 | 132 |
| dn/dT 20–40° C($\times 10^{-6}$/° C) | −7.5 | −8.5 | −6.7 | −7.1 | −8.1 | −8.1 |
| G 20–40° C($\times 10^{-6}$/° C) | +0.2 | −0.6 | +0.9 | +0.6 | −0.1 | +0.1 |
| Da | 3 | 3 | 3 | 3 | 2 | 3 |

Example No.

Table 1-continued

| Component | 13 | 14 | 15 | 16 | 17 | 18 |
|---|---|---|---|---|---|---|
| $P_2O_5$ | 39.5 | 36.0 | 29.9 | 32.0 | 32.6 | 34.3 |
| $K_2O$ | 16.4 | 16.6 | 8.3 | 14.7 | 12.0 | 9.5 |
| BaO | 25.6 | 23.9 | 44.8 | 38.4 | 39.2 | 36.0 |
| $Al_2O_3$ | 3.5 | 7.2 | 6.0 | 3.2 | 3.3 | 3.4 |
| $TiO_2$ | 11.1 | 11.3 | 9.4 | 10.0 | 10.1 | 10.7 |
| $Nb_2O_5$ | — | — | — | — | — | — |
| $Ta_2O_3$ | — | — | — | — | — | — |
| $B_2O_3$ | 3.9 | 4.0 | 1.6 | 1.7 | 1.8 | 1.9 |
| $Li_2O$ | — | — | — | — | 1.0 | — |
| $Na_2O$ | — | — | — | — | — | 4.2 |
| MgO | — | — | — | — | — | — |
| CaO | — | — | — | — | — | — |
| SrO | — | — | — | — | — | — |
| ZnO | — | — | — | — | — | — |
| PbO | — | — | — | — | — | — |
| $As_2O_3$ | — | 1.0 | — | — | — | — |
| nd | 1.6257 | 1.6201 | 1.6515 | 1.6404 | 1.6543 | 1.6527 |
| νd | 34.5 | 38.0 | 41.8 | 38.8 | 37.5 | 37.0 |
| α 20–40° C(×10$^{-7}$/° C) | 127 | 117 | 118 | 139 | 126 | 138 |
| dn/dT 20–40° C(×10$^{-6}$/° C) | −8.0 | −6.7 | −6.4 | −10.4 | −8.9 | −8.2 |
| G 20–40° C(×10$^{-6}$/° C) | −0.1 | +0.5 | +1.3 | −1.5 | −0.7 | +0.8 |
| Da | 4 | 4 | 3 | 4 | 3 | 4 |

| Component | Example No. | | | | | |
|---|---|---|---|---|---|---|
| | 19 | 20 | 21 | 22 | 23 | 24 |
| $P_2O_5$ | 34.4 | 35.5 | 36.0 | 29.9 | 27.8 | 32.9 |
| $K_2O$ | 15.9 | 16.3 | 16.6 | 11.3 | 10.6 | 12.1 |
| BaO | 24.8 | 25.5 | 26.0 | 36.9 | 34.4 | 34.4 |
| $Al_2O_3$ | 3.4 | 3.5 | 3.6 | 6.1 | 5.7 | 3.3 |
| $TiO_2$ | 10.8 | 11.1 | 11.3 | 9.6 | 9.0 | 10.3 |
| $Nb_2O_5$ | — | — | — | — | — | — |
| $Ta_2O_3$ | — | — | — | — | — | — |
| $B_2O_3$ | 1.9 | 1.9 | 2.0 | — | — | 1.8 |
| $Li_2O$ | — | — | — | — | — | — |
| $Na_2O$ | — | — | — | — | — | — |
| MgO | — | — | 4.5 | — | — | — |
| CaO | — | 6.2 | — | — | — | — |
| SrO | — | — | — | 6.2 | — | — |
| ZnO | 8.8 | — | — | — | — | 5.2 |
| PbO | — | — | — | — | 12.5 | — |
| $As_2O_3$ | — | — | — | — | — | — |
| nd | 1.6413 | 1.6386 | 1.6286 | 1.6384 | 1.6708 | 1.6530 |
| νd | 36.1 | 37.2 | 38.2 | 42.9 | 37.3 | 37.7 |
| α 20–40° C(×10$^{-7}$/° C) | 120 | 123 | 119 | 125 | 137 | 117 |
| dn/dT 20–40° C(×10$^{-6}$/° C) | −6.6 | −7.0 | −6.0 | −7.7 | −7.9 | −6.9 |
| G 20–40° C(×10$^{-6}$/° C) | +1.1 | +0.9 | +1.5 | +0.3 | +1.3 | +0.7 |
| Da | 4 | 3 | 3 | 3 | 3 | 3 |

In the tables the values for (1) α 20°–40° C, (2) dn/dT 20°–40° C, and (3) G 20°–40° C are those at a temperature of 20° to 40° C, and the Da represents the weight loss (wt%) of the glass and was evaluated in the following manner:

Pulverized glass having a particle size of 420 to 590 microns was charged into a flask made of a quartz glass containing a 0.1N—$HNO_3$ aqueous solution and the flask was then immersed in a boiling water bath for 1 hr. The weight loss (wt%) was then classified into the following grades.

| | Grade | | | | | |
|---|---|---|---|---|---|---|
| | 1 | 2 | 3 | 4 | 5 | 6 |
| Weight Loss (wt%) | ≦0.19 | 0.20–0.34 | 0.35–0.64 | 0.65–1.19 | 1.20–2.19 | ≧2.20 |

The glass of this invention has superior chemical resistance to conventional glasses having optical constants similar to those of the glass of this invention and in which the temperature dependence of the length of the light path is nearly zero, as shown in Table 2 below where the chemical resistance of glasses of this invention and those of the prior art were compared.

Table 2

| | Example No. | | | |
|---|---|---|---|---|
| | 2 | 37109-3 | 8 | 37109-4 |
| nd | 1.6201 | 1.6153 | 1.6164 | 1.6038 |
| νd | 38.0 | 39.9 | 44.5 | 43.0 |

Table 2-continued

| | Example No. | | | |
|---|---|---|---|---|
| | 2 | 37109-3 | 8 | 37109-4 |
| dn/dT 20–40° C (×10$^{-6}$/° C) | −6.7 | −4.2 | −8.5 | −5.3 |
| G 20–40° C (×10$^{-6}$/° C) | +0.5 | +2.0 | −0.6 | +1.0 |
| Da | 4 | 5 | 3 | 5 |

In Table 2 above, 37109-3 and 37109-4 mean Examples 3 and 4 of Japanese Patent Application (OPI) No. 37109/76, respectively.

Further, the glass of this invention has an additional characteristic that the stability to crystallization is high, which makes it possible to prepare a large block of glass, e.g., having a size of 300 × 200 × 50 mm, or more.

To prepare the glasses of this invention and in the above examples, an orthophosphoric acid and various phosphates are used as a material for $P_2O_5$, and for the other components, starting materials generally suitable for optical purposes are used. The components are mixed and melting of the glass is performed in a platinum melter at a temperature of about 1200° to about 1300° C. Desirably, the melting is carried out in an oxidizing atmosphere to inhibit reducing reactions.

While the invention has been described in detail and with reference to specific embodiments thereof, it will be apparent to one skilled in the art that various changes and modifications can be made therein without departing from the spirit and scope thereof.

What is claimed is:

1. A phosphate optical glass having an Abbe number in the range of 51 to 33, a refractive index ($nd$) of 1.57 to 1.68, and whose length of the light path is substantially independent of temperature, consisting essentially of in % by weight,

| | |
|---|---|
| $P_2O_5$ | 27 – 55 |
| $K_2O$ | 6 – 26 |
| BaO | 10 – 50 |
| $K_2O$ + BaO | larger than 35 |
| $Al_2O_3$ | 2 – 15 |
| $TiO_2$ + $Nb_2O_5$ + $Ta_2O_5$ | 4 – 20 |
| $TiO_2$ | 0 – 14 |
| $Nb_2O_5$ | 0 – 20 |
| $Ta_2O_5$ | 0 – 7 |
| $B_2O_3$ | 0 – 5 |
| $Li_2O$ | 0 – 2 |
| $Na_2O$ | 0 – 5 |
| MgO | 0 – 6 |
| CaO | 0 – 8 |
| SrO | 0 – 10 |
| ZnO | 0 – 10 |
| PbO | 0 – 13, and |
| $As_2O_3$ | 0 – 2. |

* * * * *